March 26, 1946.  S. T. HOWARD  2,397,142
FILTER
Filed April 24, 1941  3 Sheets-Sheet 3
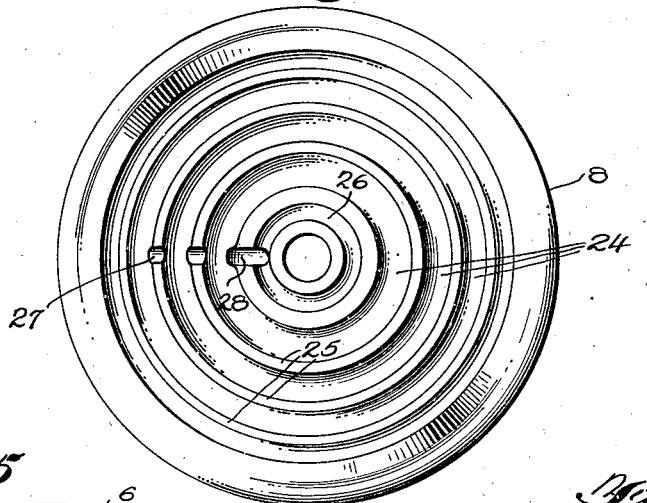
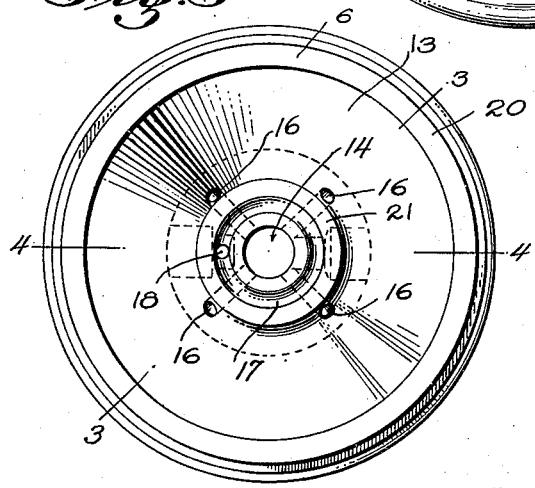
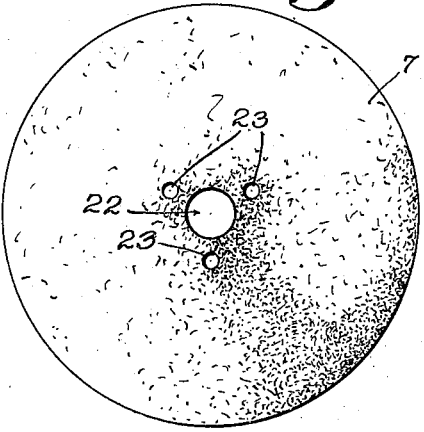
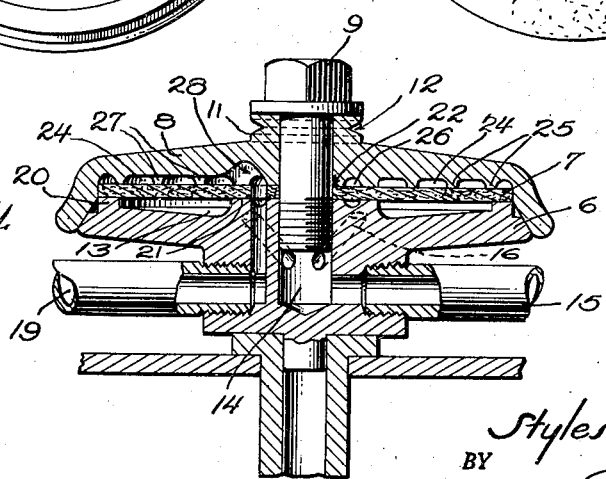
INVENTOR.
Styles T. Howard
BY
William F. Desmond
ATTORNEY Patented Mar. 26, 1946

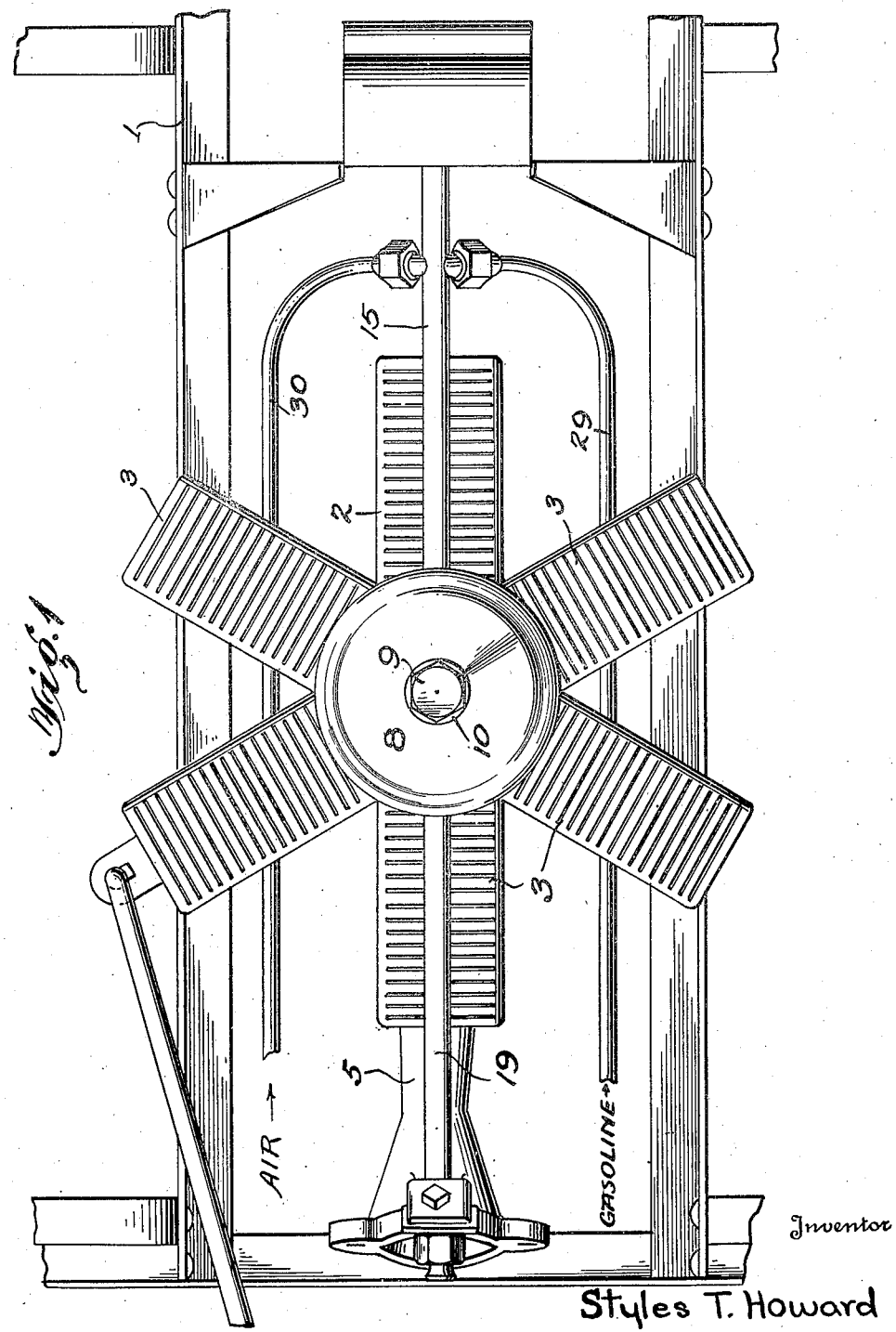

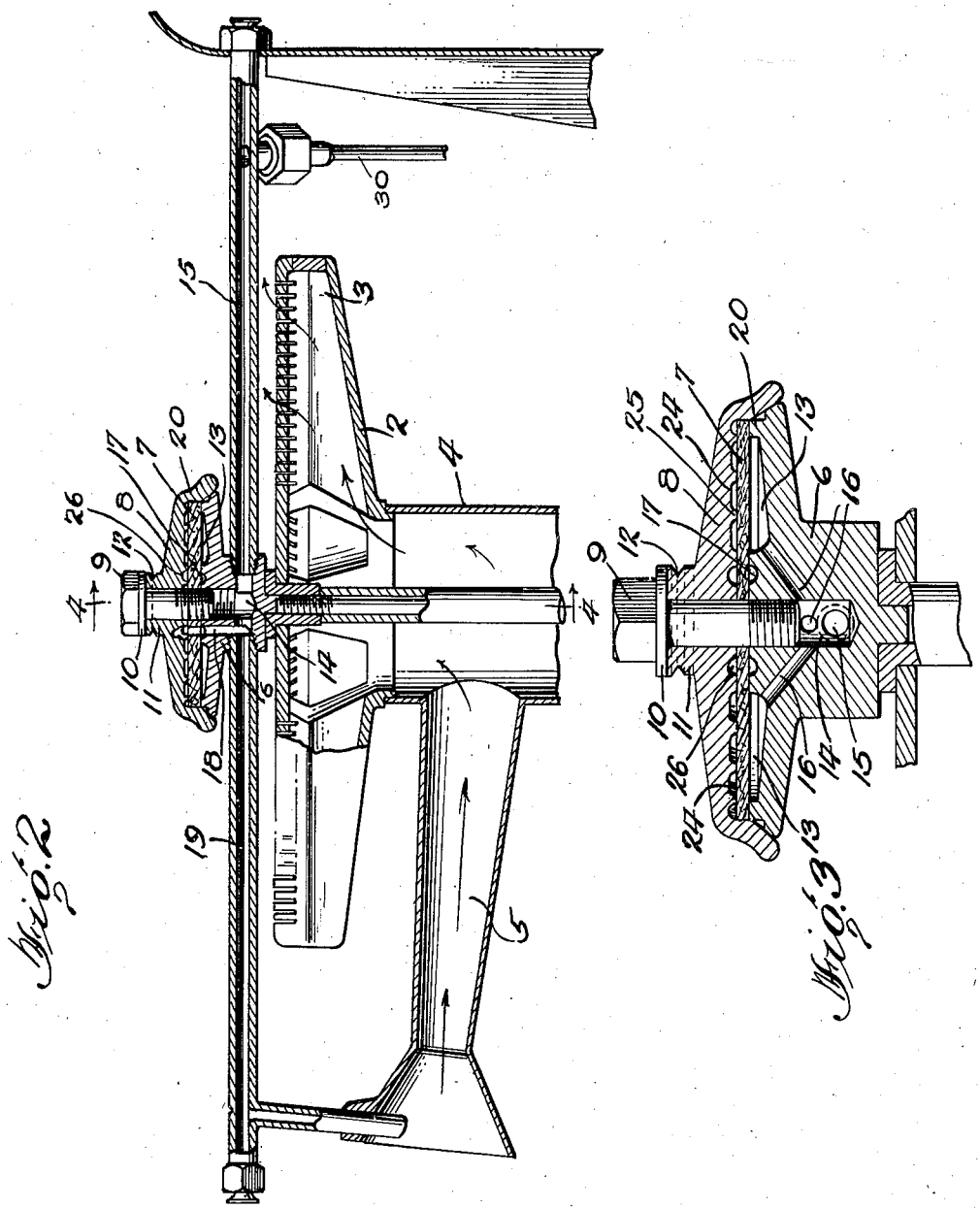

2,397,142

UNITED STATES PATENT OFFICE 2,397,142

FILTER

Styles T. Howard, Jeffersonville, Ind.

Application April 24, 1941, Serial No. 390,122

6 Claims. (Cl. 158—53)

(Granted under the act of March 3, 1883, as amended April 30, 1928; 370 O. G. 757)

The invention described herein, if patented may be manufactured and used by or for the Government for governmental purposes without the payment of any royalty thereon.

This invention relates to improvements in filters, and, more particularly, to a filter for liquid fuels, such as treated gasoline, commonly used in internal combustion engines or the like, and is especially adapted, in the form shown, for the filtering of gasoline into which tetraethyl lead or other foreign substances have been added or have found their way.

An object of this invention is to provide means whereby the higher grades of liquid fuel may be relieved of foreign substances and be prepared as a combustible mixture.

Another object is to provide means whereby fuel containing undesirable foreign matter, especially in instances in which said foreign matter is not in suspension, may be treated in such a manner as to cause a division of the desirable and undesirable elements of the fuel, and then the undesirable element entirely separated from the flow of fuel on its way to the point of combustion.

A further object is to provide means whereby combined liquid fuel and air under pressure will be progressively raised in temperature to a desired degree, then passed through a filtering element wherein portions of the original combination of liquid fuel and air will be retained, and then the desirable or remaining part of the fuel raised to a higher or vaporizing temperature, in which condition said fuel may be directed to a suitable burner.

Other objects and advantages will appear in the following description and be more fully pointed out in the appended claims.

While a preferred form of the improved filter, as applied in a specific manner, is shown and described, it will be understood that changes in form and minor details of construction may be resorted to without departing from the spirit of invention, or falling beyond the scope of the claims.

By reference to the accompanying drawings, similar reference characters designate corresponding parts throughout the several views in which:

Figure 1 is a plan view of my improved filter arranged in position above a form of burner.

Figure 2 is a vertical longitudinal section through the parts shown in Figure 1.

Figure 3 is an enlarged vertical section through the central portion of the filter indicated on line 3—3 of Figure 5.

Figure 4 is a vertical section through the central portion of the filter as indicated on line 4—4 of Figure 5.

Figure 5 is a plan view of the filter case.

Figure 6 is a plan view of the filter disk.

Figure 7 is an inverted plan view of the filter cap.

Reference now being had to the drawings by numerals, 1 indicates a frame on which a burner 2 is mounted, said burner having arms 3 provided with slots through which the combustible mixture is discharged and burned. The burner is mounted for limited rotation on a mixing chamber having an extension 5 through which the combustible mixture is directed, thoroughly mixed and discharged through the burner as above described. Said extension 5 is of Venturi form, for the purpose of more thoroughly mixing the fuel on its passage to the burner. The filter forming the subject matter of this invention consists of a filter case body 6, a filter disk 7, and a filter cap 8.

Securing the filter cap in place on the base 6 is a bolt 9, having arranged beneath its head a washer 10 drawn firmly down on the upper surface of a boss 11 of the cap. Said boss is provided with a V-shaped circumferential groove 12. The upper surface of the base 6 is provided with a depressed portion, forming chamber 13. A central bore 14 is in communication with a generator tube 15, and ports 16 lead from the central bore 14 to said chamber 13. A groove 17 is arranged adjacent to the center of the upper face of the filter case body from which groove a port 18 extends downwardly and communicates with a hot vapor tube 19.

The filter disk 7, which may be constructed of any suitable filtering material, accurately fits the upper disk supporting flange 20 of the base, and rests on the center portion of the upper face of the base 21. It is provided with a central opening 22, through which bolt 9 passes. Said disk is further provided with perforations 23, arranged when the disk is in position on the base to rest directly over groove 17 of the base. With the parts in place as above described, fuel flowing from generator tube 15 to bore 14 will be directed up through ports 16 to the chamber 13 beneath the filter disk.

The filter cap, the under face of which is shown in Figure 7, is provided with annular channels 24, said annular channels providing therebetween annular filter supporting ribs 25.

The fuel entering chamber 13 is under pressure, and the filter supporting ribs 25 prevent portions of the filter member being forced into and closing annular channels 24.

The filter cap is further provided with an annular groove 26, in alignment with groove 17 of the filter case body, from which fuel, after it has been filtered, passes down through perforations 23 into groove 17 of the base, and from there through port 18 to the hot vapor tube 19. By reference to Figure 7, it will be seen that the ribs 25 are cut away at 27, which permits the filtered fuel in the outer annular channels 24 to reach the inner channel, and from there, through passage 28 and formed in the cap, connecting inner channel 24 and annular groove 26. By said means fuel entering the base as described through generator tube 15 passes up through filter disk 7 into the grooves of the filter cap, and from thence down through port 18 to hot vapor tube 19, through which it reaches the mixing chamber of the burner.

In the form shown, gasoline, or other liquid fuel to be filtered, is forced under pressure through tube 29 to the generator tube 15 and air under pressure is admitted to said generator tube 15 through tube 30.

In the arrangement here disclosed, the filter is mounted with relation to a burner in such a manner as to provide a combustible vapor resulting from the admission of liquid fuel and air into the generator tube. In starting the burner the mixture will be directed through the burner and will provide a volatile vapor that may be ignited to set up the preliminary temperature in the generator tube and in the hot vapor tube to start the normal operation of the burner.

After a brief preliminary heating of the parts, the admission of air under pressure is cut off and the flow of fuel continues through the generator tube, which, when brought to the desired temperature, discharges, in the instance here described, the lead of the treated gas in the form of small particles, which are arrested by the filter disk, the filtered gasoline passing through the filter and out through the hot vapor tube, in the manner described, and from there being directed to the burner in any preferred manner.

Said burner, as stated above, may be of any preferred form that will direct its flame in such a manner as will heat the parts of the filter including the generator tube, the filter assembly, and the hot vapor tube, it being necessary only to have the inlet for the fuel in such position as will cause a rise of temperature in the fuel as it advances toward the filter assembly which provides for the separation and the suspension of the elements of the fuel to be separated by the filter.

Having thus described my invention what I claim as new and desire to secure by Letters Patent is:

1. The method of removing tetraethyl lead from leaded gasoline consisting of heating said treated gasoline to a temperature sufficiently high to convert said gasoline to vapor and to separate the lead from the gasoline in the form of particles in suspension and separating the said lead from the gasoline vapor by passing said vapor through a heated filter.

2. The process of removing tetraethyl lead from gasoline which comprises vaporizing the gasoline at a temperature sufficient to separate the tetraethyl lead from the gasoline in the form of particles in suspension, separating the particles from the vapor by passing the mixture through a heated filter, oxidizing the vapor after such separation, and employing part of the hot combustion products generated by the aforesaid oxidation to vaporize a further supply of gasoline to continue the process.

3. A filter for vaporized gasoline comprising a body portion having a depressed annular chamber in its upper face and a central bore forming an inlet at its lower end and having radially arranged ports connecting said bore and said chamber, a filter disk arranged above said chamber in the body portion, a filter cap having communicating annular channels providing annular filter supporting ribs therebetween on its under face, said disk having perforations in line with the inner annular channel of the cap and said body portion having an annular groove in line with said filter disk perforations and having an outlet for the filtered gasoline, and means for removably securing the parts of the filter together to provide for quick separation and removal of said filter disk.

4. A vapor fuel burner having an attachment for vaporizing and deleading gasoline containing tetraethyl lead to be supplied to the burner comprising an elongated vaporizing tube and a filter assembly, said attachment secured to the burner with the tube heated directly thereby to vaporize the gasoline before it reaches the filter, the filter assembly comprising a body having a removable cover and also receiving heat from the burner and containing a removable filter body through which the vapor passes and by which the lead particles resulting from the decomposition of the lead tetraethyl by the heat are removed from the vapor.

5. In an apparatus for deleading and burning hydrocarbon fuel containing tetraethyl lead, the combination of a vaporizer and filter and a burner, said vaporizer and filter comprising a body portion adapted to be secured centrally over the burner, an elongated tube constituting a vaporizing inlet passage secured to said body and extending horizontally across the burner on one side, said body having an annular chamber in its top and a central bore in communication with said tube and communicating with said annular chamber by means of radial ports in said body, a filter disk in said chamber, a filter cap secured to said body and having communicating annular channels with annular ribs therebetween to support said filter, said filter disk and body having passages in communication with the innermost cap channel, and an elongated tube secured to said body at the end of said last mentioned passages and extending horizontally across the burner for passage of the vaporized fuel to the burner.

6. In combination a flat topped, multiple-armed burner having a vaporizing and filter assembly comprising a filter body secured to said burner at the center, vaporizing inlet and outlet tubes extending horizontally from the filter body and having a portion of each tube nearest the filter overlying a burner arm and another portion of each tube extending beyond the margin of the burner, a filter disk within said body, and a cap removably secured to said body and enclosing said disk.

STYLES T. HOWARD.